United States Patent [19]
Egan et al.

[11] Patent Number: 5,432,623
[45] Date of Patent: Jul. 11, 1995

[54] OPTICAL LENS INCORPORATING AN INTEGRAL HOLOGRAM

[76] Inventors: Michael S. Egan, 2904 Devils Tower, El Paso, Tex. 79904; Carl E. Chesak, 5837 Beaumont Pl., El Paso, Tex. 79912

[21] Appl. No.: 127,783
[22] Filed: Sep. 27, 1993
[51] Int. Cl.6 ............................................. G02B 5/32
[52] U.S. Cl. ....................................... 359/15; 351/41; 351/51
[58] Field of Search ................. 359/15, 19, 3; 351/41, 351/44, 51

[56] References Cited

U.S. PATENT DOCUMENTS

| | | | |
|---|---|---|---|
| 4,315,665 | 2/1982 | Haines | 359/15 |
| 4,934,792 | 6/1990 | Tovi | 351/44 |
| 5,016,950 | 5/1991 | Smith | 359/15 |
| 5,103,323 | 4/1992 | Magnainos et al. | 359/8 |

FOREIGN PATENT DOCUMENTS

| 2101764 | 1/1983 | United Kingdom | 359/19 |
|---|---|---|---|

*Primary Examiner*—Samuel A. Turner

[57] ABSTRACT

A lens design consisting of a multi-component assembly, with one of the said components being a (decorative) hologram. The said assembly being comprised of an optical-quality holographic recording material coating applied to the inner or outer surface of a primary lens element, upon which a hologram may then be recorded in-situ, and may be used alone, or be optically contacted to a secondary lens element to form a unitary assembly of high optical quality and clarity, with the holographic recording material being encapsulated between the primary and secondary elements. The said lens assembly may be of simple or compound curvature, and be used in functional, prescription-quality eyewear of single or multi-lens type. Also, one or more of the lens components, other than the hologram, may function in a light-filtering role, so as to visually eliminate unwanted images or colors to the wearer, and further allow such lens assemblies to be used in sunglasses. In addition, the said lens assembly may contain multiple images on the holographic recording material, which are visible to an observer during different periods of daytime sunlight, or under various artificial lighting conditions.

47 Claims, 1 Drawing Sheet

OPTICAL LENS INCORPORATING AN INTEGRAL HOLOGRAM

FIELD OF INVENTION

This invention relates to an optical quality lens containing a holographic image.

BACKGROUND

The present invention relates to a functional, optical-quality lens assembly incorporating a decorative hologram as an integral portion of its structure, and the methods of manufacture of said lens assembly. The integral hologram may contain one or more holographic images or information recorded on a thin-film coating of holographic recording material which is optically smooth, and does not require any small scale three dimensional surface topology to be able to provide an external observer with an apparent three dimensional view of objects, letters, patterns, etc.

This is an important distinction from previous patent literature describing three dimensional images on sunglass lenses, as in U.S. Pat. No. 4,934,792, which employ a physical deformation of an intermediate material to form the three dimensional image. In addition, the perceived depth of the image can be much greater with the holographic approach, as opposed to bas reliefs as described in U.S. Pat. No. 4,934,792.

Also of great significance to the present invention is its relation to being a fully functional, prescription-quality lens that provides high optical clarity and minimal eyestrain to the wearer, making it suitable for long-term wear under critical conditions, such as while driving or playing sports. This uniquely distinguishes this invention from commonly available novelty holographic glasses, which are not suitable for use as functional ophthomalic eyeglasses, nor do they provide the light filtering abilities of the present invention, so as to eliminate undesirable illumination or transmission of reflected or transmitted light from the holographic recording material, and additionally allow for overall light filtering, as in the possible application to sunglasses.

The progression of novelty items to the state of the presently described invention is not obvious due to inherent difficulties in producing high optical quality curved lens elements incorporating a holographic recording material that provide very high optical clarity to the wearer and do not suffer from defects such as light scatter, holographic coating irregularities, and delamination. To achieve such results as to produce a high optical quality lens incorporating a hologram requires fundamental design aspects and scientific principles which cannot be solely attributed to being obvious from existing novelty items, nor as an improvement on their design, due to the multiple components required in the presently described invention to achieve the desired high optical quality resulting lens.

The present invention achieves a high optical quality through the careful selection of low scatter, high transmission holographic recording materials, careful attention to the surface curvature and surface finish of the lens elements, and the uniformity of the holographic recording material coating. In the present case, the hologram is merely a reflective decorative component, and all light filtering ability, such as to allow its use for applications such as sunglasses, is provided by other components of the design. This uniquely distinguishes this invention from other patent literature, as in U.S. Pat. No.5,103,323, which relates to the use of a holographic optical element (HOE) as the active light filtering element to block specific wavelengths of laser light.

SUMMARY

The primary object of the present invention is to provide a high optical quality lens assembly of arbitrary shape and curvature, which incorporates a hologram as an integral portion of the lens, while maintaining a visual clarity so as to allow the undistorted passage of coherent rays of light.

A second objective is the incorporation of said optical quality lens assembly in both prescription and non-prescription eyewear, of single or multi-lens design, which will allow an observer to view apparent three dimensional holographic images of life-like depth and contrast on the completed lens, with minimal or imperceptible visual distraction or disturbance to the wearer.

A third objective is to provide an object or material of arbitrary shape and curvature with a uniform optical quality holographic recording material coating which can then be employed to record a holographic image or information on the object in-situ.

A further object of the present invention relates to its applicability to items which may be manufactured or improved upon by employing the principles and techniques as outlined within the detailed description of the present invention. Such items include both those that are intended to be worn, such as ski goggles, head-mounted head-up-display devices, and holographic fabrics and clothing, as well as mechanical items that may employ holographic optical elements, as in guided missile seeker components and radomes, security systems, building materials such as windows and floor and wall tiles, non-destructive testing, holographic mask alignment systems for semiconductor integrated circuit production, and virtual reality devices, including flight simulators.

All of the above areas may benefit from the techniques and principles embodied herein to allow holographic images or information to be recorded on curved surfaces in-situ, as is described in tile detailed description of the present invention, as opposed to the more common methods of hologram recording oil flat or stress curved films, which are then transferred to the final shape for the intended use.

Other further objects, advantages, and modifications of the present invention may become evident to those knowledgeable and skilled within the art upon reading the detailed description of the present invention. Such items are considered to be within the spirit and scope of the detailed description given for the present invention.

DETAILED DESCRIPTION

A more detailed description of the present invention follows, with specific reference to the accompanying drawings, FIGS. 1-5. In the present case, this description orients itself toward the application of the present invention to eyewear, although could equally apply to any optical quality lens assembly, of arbitrary shape and curvature, with a holographic image or information recorded within the holographic recording material component of the assembly.

Figure 1:
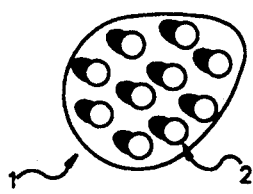
FIG. 1 is a diagram showing a typical completed lens assembly suitable for use in multi-lens eyewear, which is flat or of simple or compound curvature, with an illustrative representation of the three dimensional image an observer may view.
Figure 2:
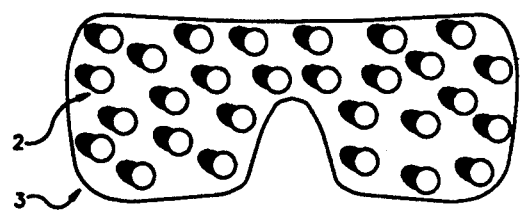
FIG. 2 is a diagram showing a typical completed lens assembly suitable for unitary lens eyewear, which is flat or of simple or compound curvature, with an illustrative representation of the three dimensional image an observer may view.

Referring now to FIGS. 1 and 2, shown are two possible completed optical lens assemblies, 1 and 3, for use in eyewear which is of multi-lens or unitary lens type, respectively. The materials comprising the various components of these lenses shown in finished form is given in the body of this description below in reference to FIGS. 3 and 4. Each of FIGS. 1 and 2 illustrates a representation 2 of an arbitrary three dimensional holographic image which an observer may view under appropriate lighting conditions, and is recorded within the holographic recording material 5 of FIGS. 3 and 4.

Figure 3:
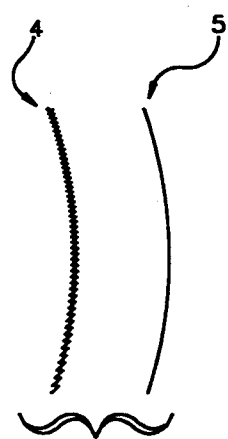
FIG. 3 is a typical cross sectional view of the component comprising one form of the present invention, with the holographic recording material coating shown on the outer surface of the primary lens element.
Figure 4:
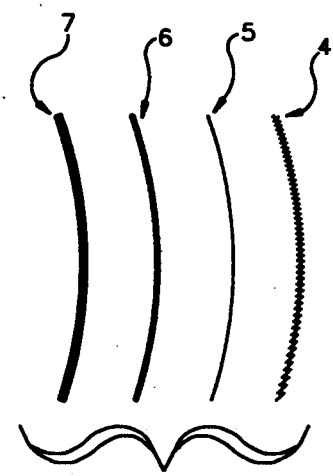
FIG. 4 is a typical cross sectional view of the components comprising another form of the present invention, with the holographic recording material coating shown on the inner surface of the primary lens element.
Figure 5:
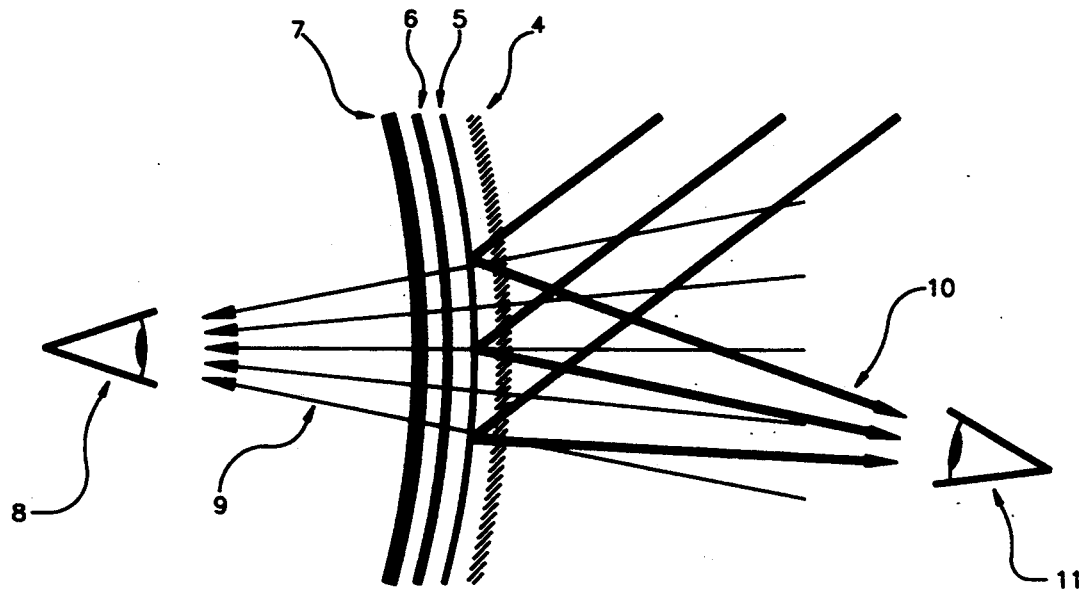
FIG. 5 is a cross sectional representation of the path of coherent light rays as seen by the wearer on the left, and image formation seen by the observer on the right.

Embodied within FIGS. 3 and 4 are the essential components of the present invention, with FIG. 3 being for a two-component assembly, and FIG. 4 for a multi-component assembly.

Component 4 is a primary lens element, of arbitrary shape and curvature, which has optical quality inner and outer polished surfaces, and generally should be transparent to wavelength(s) of electromagnetic radiation used to form the holographic image or information in 5. For the purposes of the present description, common materials for this lens element 4 may include optical quality glasses such as BK-7 or Quartz, or optical quality plastics, as in acrylic or polycarbonate. Additionally, this primary lens element may have light filtering additives or coatings applied to it, so as to provide similar functional light filtering capabilities as components 6 and 7 described below.

For items such as guided missile components, the material of interest for the lens element 4 may be optical quality silicon, which is opaque to the human eye, but transparent to electromagnetic radiation in the near and mid-infrared spectrum.

Component 5 is an optical quality coating of holographic recording material, which is coated directly onto the inner or outer polished surfaces of lens element 4. This coating may be any one or combination of several widely available holographic recording materials, including, but not limited to, photopolymers, silver halide, and dichromated gelatin. In the case of lenses to be worn by persons, photopolymers are the preferred holographic recording material. Such photopolymers in liquid form are capable of being applied as repeatable optical quality coatings on arbitrary shape and curvature surfaces of 4, and when fully processed show very high light transmission in the visible spectrum, and very little light scatter from the bulk material. Consideration must also be given to the choice of compatibility between lens element 4 and holographic recording material 5 so as to achieve an intimate bond between them. In the present description, liquid photopolymers bond very well when coated in liquid form on optical glasses and plastics.

The methodology of obtaining an optical quality holographic recording material coating 5 on lens element 4 is essential to producing high quality, distortion free completed lens assemblies. This is particularly true when working with curved surfaces. In the present description, necessarily involving compound curvatures, the preferred method is by dip-coating lens element 4 within a solution of holographic recording material maintained at 20 degrees centigrade, 0% relative humidity, and Class 100 Clean Room particle cleanliness to form a uniform coating 5 of thickness between 15 and 30 microns directly on the inner or outer surface of lens element 4. The inner or outer surface of lens element 4 may be masked during the coating process, and stripped of this mask after coating to leave 5 on one surface only of lens element 4. Additionally, chamfering the edge of lens element 4 to a semi-pointed shape before coating will help to reduce excess coating buildup around the perimeter of 4.

The viscosity of the holographic recording material, due to both composition and temperature, as well as the speed of withdrawal of lens element 4 from the holographic recording material solution, are the primary factors in determining the thickness of the applied coating 5 to lens element 4. It has been found that viscosities between 1-1000 centipoise and withdrawal speeds between 0.001-0.1 centimeters per second are best, with a viscosity of 400 centipoise and a withdrawal speed of 0.007 centimeters per second being optimum. The overall coating uniformity is determined mainly by the control of withdrawal speed, with computer control and active feedback methods necessary to allow for such variables as the contact angle between lens element 4 and the surface of the holographic recording material solution it is being withdrawn from, especially in the case of curved surfaces on lens element 4.

Alternative methods in obtaining such a coating of 5 on lens element 4 include placing drops of the liquid holographic recording material on a highly polished non-stick surface, such as teflon or a surface impregnated with teflon, of appropriate shape and curvature, and then placing lens element 4 on top of this surface, spreading the holographic recording material uniformly over the inner or outer surface of lens element 4. Upon evaporation of solvents in the holographic recording material, the lens element 4 with component 5 intimately bonded to it can now be removed from the polished non-stick surface.

In most cases, the combination of lens element 4 and holographic recording material coating 5 will be used in this form to serve as a suitable structure for the recording of a holographic image or information directly on this combination in-situ. This is in marked contrast to the normal methods of recording first on flat or stress-curved films, and then transferring these films to curved structures, which does not allow for high optical quality lens assemblies free from distortions and delaminations. Any suitable holographic image or information within the limitations of the holographic recording material may be recorded within 5, and for the present description may be a white-light viewable, image plane or other reflection type of holographic image.

At this point, the combination of lens element 4 and its integral holographic recording material coating 5, as shown in FIG. 3, with a holographic image(s) or information recorded within it, may be used alone as a two-component optical lens assembly, or may be used in conjunction with further components to produce a multi-component assembly, as shown in FIG. 4 and described below.

Component 6 represents an optical contacting agent which is used to optically contact tile combination of lens element 4 and its integral holographic recording material coating 5 to component 7, a secondary lens element, thereby encapsulating the holographic recording material between the primary lens element 4 and the secondary lens element 7. Common cements for component 6 include optical grade ultraviolet curing adhesives, and optical epoxies. This optical contacting cement 6 can play a functional role in the light transmission properties of the finished lens assembly, in addition to its obvious role in optically contacting the various components together. In some instances it may be desirable to filter various wavelength bands by absorption, as will be discussed in reference to FIG. 4, within this optical cement by doping it with appropriate light absorbing dyes.

There are practical considerations to be given to introducing light absorbing additives into the optical contacting cement, namely that they do not inhibit its bonding qualities, and more importantly, that the additives do not exhibit visible fluorescence or phosphorescence which would give the appearance of a cloudy lens. In addition, it is often easier to dope the optical contacting cement with light absorbing additives rather than the bulk of the material used for component 7.

Component 7 is a secondary lens element, of arbitrary shape and curvature, which has optical quality inner and outer polished surfaces. For the purposes of the present description, common materials for this lens element 7 may include optical quality glasses such as BK-7 or Quartz, or optical quality plastics, as in acrylic or polycarbonate. Other optical materials may be required to obtain the desired transmitted wavelength region, such as the ultraviolet or infrared, and additives or coatings may be applied to this lens element 7 to modify its light transmitting/reflecting qualities. Of particular importance are optical materials which can provide light filtering abilities suitable for eyewear, namely protection from ultraviolet light, and also overall light transmission reduction and contrast improvement, as in the case of sunglass optical materials.

Taken together, the components 4, 5, 6 and 7 form an optical quality lens assembly of arbitrary shape and curvature, with little or no perceptible distortion. Of distinct advantage is the ability to directly record holographic images or information in-situ on the transparent, arbitrary shape and curvature, combination of lens element 4 and its integral holographic recording material coating 5, so as to allow for their incorporation, either alone, or in combination with other components, such as 6 and 7, as a useful optical lens assembly with an integrated hologram, suitable for high-quality eyewear.

When assembled as described above, and using the appropriate materials, the combination of components 4, 5, 6, and 7 can form an optical quality lens assembly suitable for use in eyewear as illustrated in FIG. 4. To the wearer 8, coherent rays 9 can pass through the lens assembly undistorted so as to give the wearer a clear view of the surroundings with no visual indication of the holographic image formed by reflected rays 10 that an exterior observer 11 can view under appropriate lighting conditions. There are situations where such perfect results are only obtained when careful selection of materials is made, as to be described shortly below.

The source of lighting for both the wearer 8 and external observer 9 may be either natural or artificial. The integral holographic recording material coating 5 may contain one or more holographic images which appear to the observer 11 under various lighting conditions and angles, each image typically having an angular viewing bandwidth on the order of 20 degrees, depending on the nature of the holographic image. Due to the high optical surface quality of the holographic recording material 5, the low light scatter from holographic photopolymers, and the geometry at which the holographic image is recorded under nearly all conditions, only the observer 11 is able to see the holographic image, with the wearer 8 not being aware of the image or any distortion from the lens assembly.

However, under certain unavoidable conditions, such as certain angles of incidence in bright sunlight, internal Fresnel-type reflections can occur which can give rise to light impinging on the holographic recording material at an angle which allows the wearer 8 to see minor, but still perceptible, portions of tile holographic image. This situation may arise in other foreseen applications of such lens assemblies, and is remedied through the ability of lens component 6 and secondary lens element 7 provide filtering capability for various portions of the electromagnet spectrum, depending on the choice of light absorbing additives introduced into these components 6 and 7. This is described in more detail below.

Many holographic images or information have the property that at specific viewing angles only a very narrow dominant wavelength band of diffracted light is present in the image. In the case of unmodified photopolymer holographic images, this is a narrow wavelength band nearby the laser wavelength used to record the image. In the present case, this narrow wavelength band present in external lighting is nearly entirely redirected by the hologram to form the bundle of rays 10 forming the holographic image for the observer 11. In the undesirable case mentioned above, where under certain conditions light can impinge on the holographic material from the wrong side at such an angle so that a portion of the image can be noticed by the wearer, this unwanted image will only contain this same narrow band of dominant wavelengths, much the same as can be seen by an external observer 11.

By the addition of light absorbing or reflecting additives or coatings to one or both of components 6 and 7, any unwanted narrow wavelength band images of the hologram recorded in 5 that may be visible to the wearer may be filtered, leaving nearly all of the balance of the visible spectrum unaffected, and no objectionable color bias to the coherent bundle of rays 9 which reach the eye of the wearer 8. Additionally, in the case of eyewear designed for outdoor use in bright sunlight, typically the secondary lens element 7 will be given an overall neutral gray or brown sunglass-type tint, which in itself will provide for apparent visual elimination to the wearer of any unwanted minor portions of the holographic image which may diffract light far from the wavelength(s) filtered by the addition of specific light absorbing additives introduced into components 6 and 7 as mentioned above. Finally, the addition of anti-reflective coatings, such as magnesium fluoride or other multi-layer coatings, can increase the overall optical clarity of the completed lens assemblies.

We claim:

1. A method of preparing an optical quality lens with an integral coating of holographic recording material, suitable for the recording of holographic images or information, comprising the steps of:
   a. preparing an optical quality lens element with a semi-pointed chamfered edge;
   b. immersing the lens element in a solution of liquid holographic recording material with a viscosity between 1–1000 centipoise ([cp]), maintained in an environment of constant temperature, constant humidity, and low particulate contamination;
   c. withdrawing the lens element from the liquid holographic recording material solution at a controlled rate between 0.001–0.1 centimeters per second ([cm/s]) to achieve a holographic recording material coating thickness between 15 and 30 microns; and,
   d. removing the coated lens element to a humidity and particulate controlled environment where the remaining volatile components of the holographic recording material coating can evaporate.

2. The Method of claim 1 wherein the holographic recording material solution is a liquid photopolymer.

3. The Method of claim 2 wherein the viscosity of the liquid photopolymer is approximately 400 cp.

4. The Method of claim 2 wherein the resulting photopolymer coating on the lens element is approximately 25 microns thick.

5. The Method of claim 2 wherein the ambient environmental conditions at which the liquid photopolymer is maintained are 20 degrees centigrade, 0% relative humidity, and Class 100 Clean Room particle cleanliness.

6. A method of preparing an optical quality lens with an integral coating of holographic recording material, suitable for the recording of holographic images or information, comprising the steps of:
   a. placing several drops of liquid holographic recording material solution on a highly polished non-stick surface, such as teflon or a surface impregnated with teflon, in an environment of constant temperature, constant humidity, and low particulate contamination;
   b. placing the surface of the lens element to be coated in contact with this liquid, thereby causing it to spread uniformly between the surface of the lens element and the polished non-stick surface;
   c. allowing the lens element to remain undisturbed until the holographic recording material obtains a firm consistency; and,
   d. removing the lens element from the highly polished non-stick surface.

7. The Method of claim 6 wherein the holographic recording material solution is a liquid photopolymer.

8. The Method of claim 7 wherein the viscosity of the liquid photopolymer is approximately 400 cp.

9. The Method of claim 7 wherein the resulting photopolymer coating on the lens element is approximately 25 microns thick.

10. The Method of claim 7 wherein the ambient environmental conditions at which the liquid photopolymer is maintained are 20 degrees centigrade, 0% relative humidity, and Class 100 Clean Room particle cleanliness.

11. A lens assembly having a first side and a second side wherein light is transmitted from said second side to a wearer on said first side comprising,
    a lens element having optically polished first and second surfaces, said first surface of said lens element defining said first side of said lens assembly,
    an optically smooth layer of holographic recording material in direct contact with said second surface of said lens element, said layer of holographic recording material defining said second side of said lens assembly, and
    a holographic image recorded into said holographic recording material,
    said holographic image being recorded so that light is transmitted through said lens assembly to said wearer without said holographic image substantially diffracting, changing the focus of, or otherwise distorting the transmitted rays of light.

12. The lens assembly of claim 11 wherein said holographic image is reflected to an observer on the second side of said lens assembly.

13. The lens assembly of claim 12 wherein said holographic image is only reflected to said observer when light strikes the second side of said lens assembly at a particular angle which is within a predetermined range of incident angles.

14. The lens assembly of claim 13 wherein said holographic image comprises a plurality of images and each image is only reflected to said observer when light strikes the second side of said lens assembly at a particular angle which is within a predetermined range of incident angles.

15. The lens assembly of claim 12 wherein only light within a predetermined range of wavelengths is reflected by said holographic image such that said holographic image is only reflected when the ambient light contains light within said predetermined range of wavelengths.

16. The lens assembly of claim 11 wherein said lens element provides light filtering abilities.

17. The lens assembly of claim 16 wherein said holographic image reflects light within a predetermined range of wavelengths and the lens element filters light within said predetermined range of wavelengths so as to eliminate undesirable reflections of said holographic image to said wearer on said first side of said lens assembly.

18. The lens assembly of claim 11 wherein said lens element has a predetermined curvature for focusing light which is transmitted through said lens assembly.

19. The lens assembly of claim 11 wherein said holographic recording material is a photopolymer.

20. The lens assembly of claim 19 wherein said lens element has a semi-pointed chamfered edge.

21. The lens assembly of claim 19 wherein said holographic recording material has a thickness between 15–30 microns.

22. The lens assembly of claim 21 wherein said holographic recording material has a thickness of 20 microns.

23. The lens assembly of claim 11 wherein transmitted light passes out of the first side of said lens assembly at the same angle of incidence that it entered the second side of said lens assembly.

24. The lens assembly of claim 11 wherein said lens assembly is worn in a pair of eyeglasses.

25. The lens assembly of claim 24 wherein said eyeglasses are sunglasses.

26. The lens assembly of claim 24 wherein said eyeglasses are corrective prescription glasses.

27. A lens assembly having a first side and a second side wherein light is transmitted from said second side to a wearer on said first side comprising,
- a first lens element having optically polished first and second surfaces, said first surface of said first lens element defining said second side of said lens assembly.
- an optically smooth layer of holographic recording material in direct contact with said second surface of said first lens element,
- a holographic image recorded into said holographic recording material,
- a second lens element having optically polished first and second surfaces, said second surface of said second lens element defining said first side of said lens assembly, and
- a means for attaching the first surface of said second lens element to said holographic recording material,
- said holographic image being recorded so that light is transmitted through said lens assembly to said wearer without said holographic image substantially diffracting, changing the focus of, or otherwise distorting the transmitted rays of light.

28. The lens assembly of claim 27, wherein said holographic image is reflected to an observer on the second side of said lens assembly.

29. The lens assembly of claim 28 wherein said holographic image is only reflected to said observer when light strikes the second side of said lens assembly at a particular angle which is within a predetermined range of incident angles.

30. The lens assembly of claim 29 wherein said holographic image comprises a plurality of images and each image is only reflected to said observer when light strikes the second side of said lens assembly at a particular angle which is within a predetermined range of incident angles.

31. The lens assembly of claim 28 wherein only light within a predetermined range of wavelengths is reflected by said holographic image such that said holographic image is only reflected when the ambient light contains light within said predetermined range of wavelengths.

32. The lens assembly of claim 27 wherein said first lens element provides light filtering abilities.

33. The lens assembly of claim 27 wherein said second lens element provides light filtering abilities.

34. The lens assembly of claim 33 wherein said holographic image reflects light within a predetermined range of wavelengths and the second lens element filters light within said predetermined range Of wavelengths so as to eliminate undesirable reflections of said holographic image to said wearer on said first side of said lens assembly.

35. The lens assembly of claim 27 wherein said means for attaching the first surface of said second lens element to said holographic recording material is an optical cement.

36. The lens assembly of claim 35 wherein said optical cement provides light filtering abilities.

37. The lens assembly of claim 36 wherein said holographic image reflects light within a predetermined range of wavelengths and the optical cement filters light within said predetermined range of wavelengths.

38. The lens assembly of claim 27 wherein said first lens element has a predetermined curvature for focusing light which is transmitted through said lens assembly.

39. The lens assembly of claim 27 wherein said second lens element has a predetermined curvature for focusing light which is transmitted through said lens assembly.

40. The lens assembly of claim 27 wherein said holographic recording material is a photopolymer.

41. The lens assembly of claim 40 wherein said first lens element has a semi-pointed chamfered edge.

42. The lens assembly of claim 40 wherein said holographic recording material has a thickness between 15-30 microns.

43. The lens assembly of claim 42 wherein said holographic recording material has a thickness of 20 microns.

44. The lens assembly of claim 27 wherein transmitted light passes out of the first side of said lens assembly at the same angle of incidence that it entered the second side of said lens assembly.

45. The lens assembly of claim 27 wherein said lens assembly is worn in a pair of eyeglasses.

46. The lens assembly of claim 45 wherein said eyeglasses are sunglasses.

47. The lens assembly of claim 45 wherein said eyeglasses are corrective prescription glasses.

* * * * *